(No Model.) 6 Sheets—Sheet 2.

G. W. COPELAND & J. E. CRISP.
BOOT TREEING MACHINE.

No. 438,681. Patented Oct. 21, 1890.

WITNESSES
John L. S. Roberts
Mary E. Woodburn

INVENTORS
Geo. W. Copeland,
Jos. E. Crisp

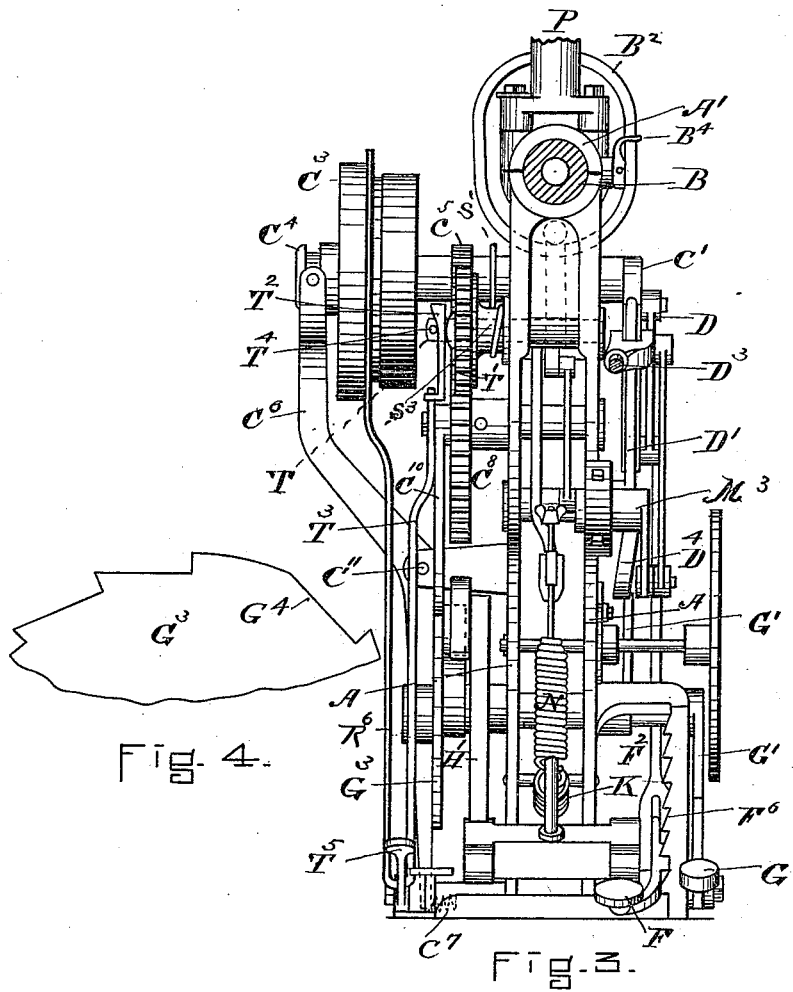
(No Model.) 6 Sheets—Sheet 3.
G. W. COPELAND & J. E. CRISP.
BOOT TREEING MACHINE.
No. 438,681. Patented Oct. 21, 1890.

(No Model.) 6 Sheets—Sheet 4.

G. W. COPELAND & J. E. CRISP.
BOOT TREEING MACHINE.

No. 438,681. Patented Oct. 21, 1890.

WITNESSES
John B. S. Roberts
Mary E. Woodburn

INVENTORS
Geo. W. Copeland
Jno. E. Crisp (No Model.) 6 Sheets—Sheet 5.

G. W. COPELAND & J. E. CRISP.
BOOT TREEING MACHINE.

No. 438,681. Patented Oct. 21, 1890.

WITNESSES.
John S. S. Roberts
Mary E. Woodburn

INVENTORS
Geo. W. Copeland,
Jas. E. Crisp (No Model.) 6 Sheets—Sheet 6.

G. W. COPELAND & J. E. CRISP.
BOOT TREEING MACHINE.

No. 438,681. Patented Oct. 21, 1890.

WITNESSES. INVENTORS

UNITED STATES PATENT OFFICE.

GEORGE W. COPELAND, OF MALDEN, AND JOSEPH E. CRISP, OF SOMERVILLE, MASSACHUSETTS, ASSIGNORS TO THE COPELAND MANUFACTURING COMPANY, OF PORTLAND, MAINE.

BOOT-TREEING MACHINE.

SPECIFICATION forming part of Letters Patent No. 438,681, dated October 21, 1890.

Application filed May 16, 1890. Serial No. 352,028. (No model.)

*To all whom it may concern:*

Be it known that we, GEORGE W. COPELAND, of the city of Malden, and JOSEPH E. CRISP, of the city of Somerville, both in the county of Middlesex and State of Massachusetts, citizens of said State and of the United States, have invented new and useful Improvements in Boot-Treeing Machines, of which the following is a full, clear, and exact description, reference being had to the accompanying drawings, forming a part of this specification.

The invention relates to improvements in boot-treeing machines, set forth in Letters Patent of the United States No. 385,298, dated June 26, 1888, granted to George W. Copeland; and the objects of the improvements are to produce a machine which will efficiently rub the leg portion of a boot by automatically-operating tools, and at the same time so present the foot portion to the operator that he can readily and effectively rub it during the time the tools are automatically rubbing the leg portion, and then by unlocking the boot-tree from the machine leave it free for subsequent manipulation. These objects are attained by the mechanism herein described, and illustrated in the accompanying drawings, in which—

Figure 1:
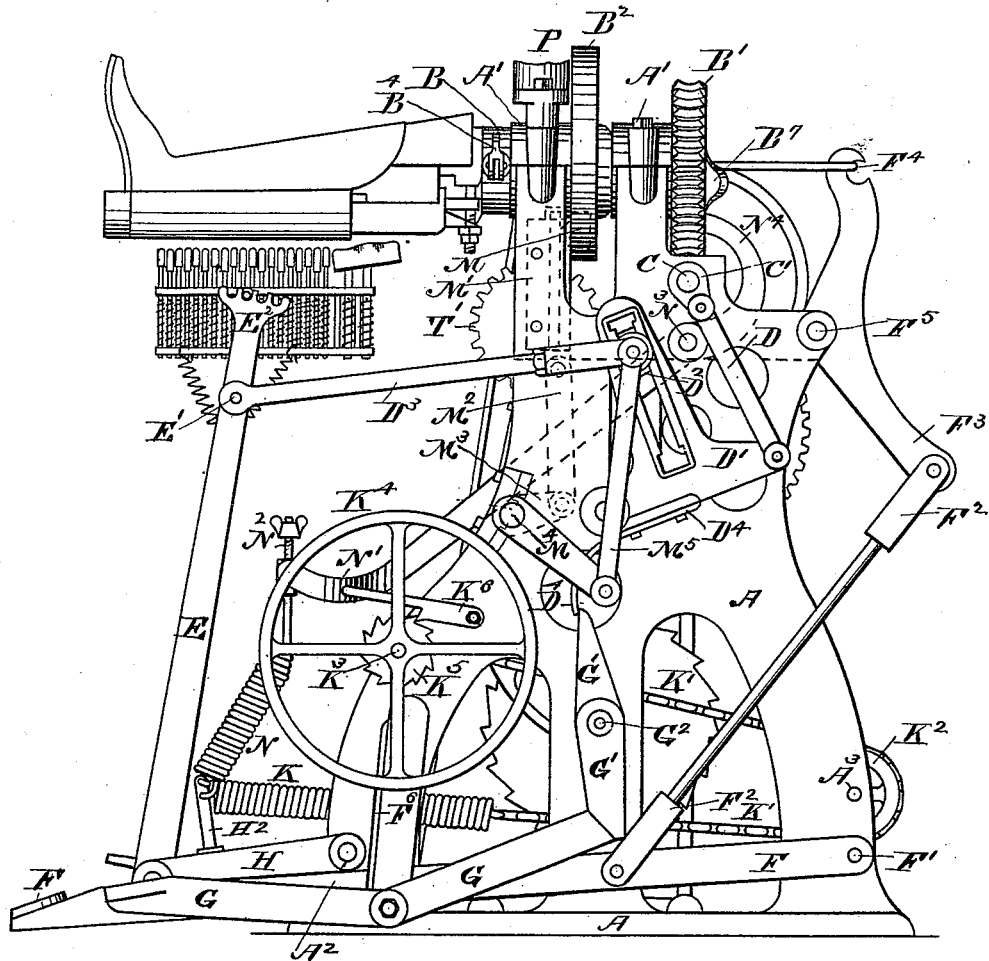
Figure 2:
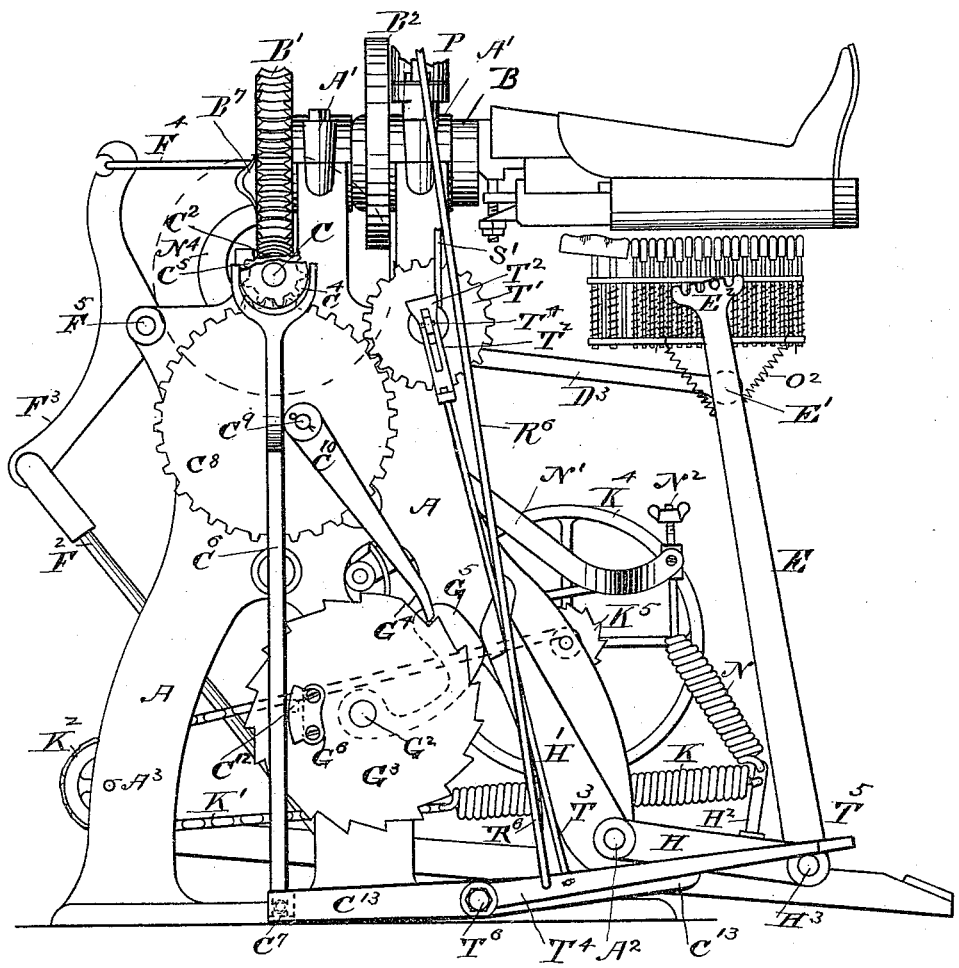
Figure 6:
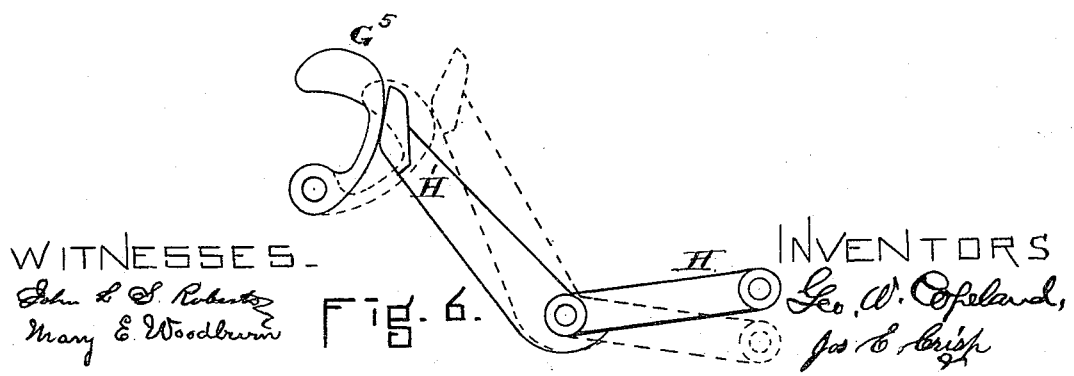
Figure 7:
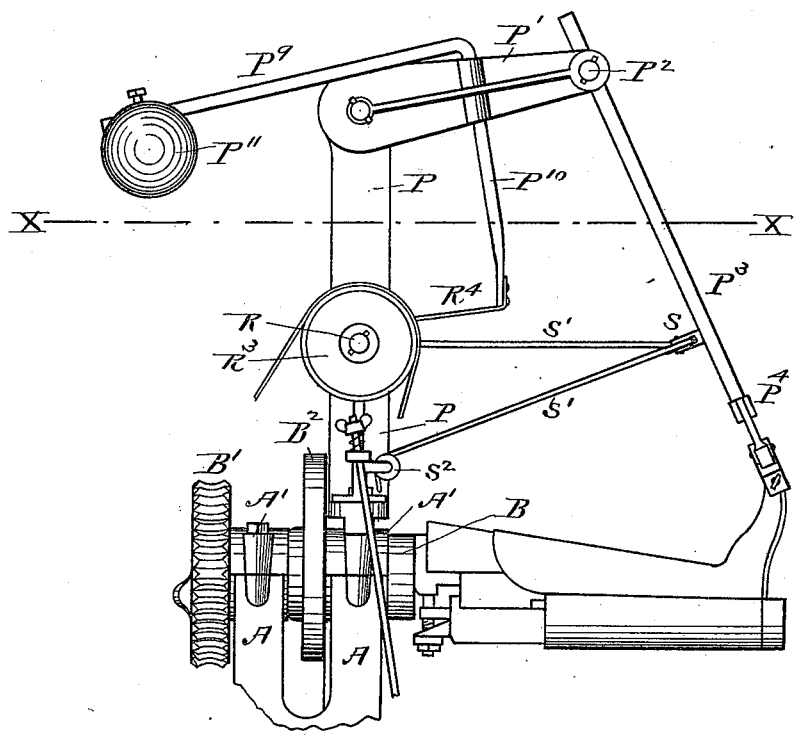
Figure 8:
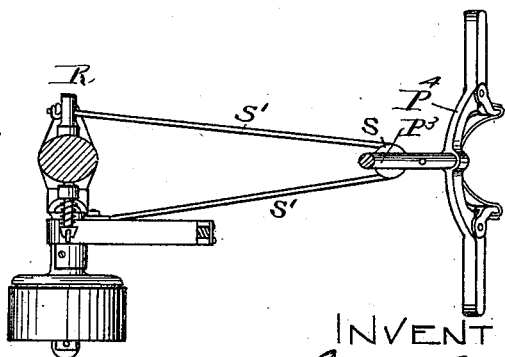
Figure 9:
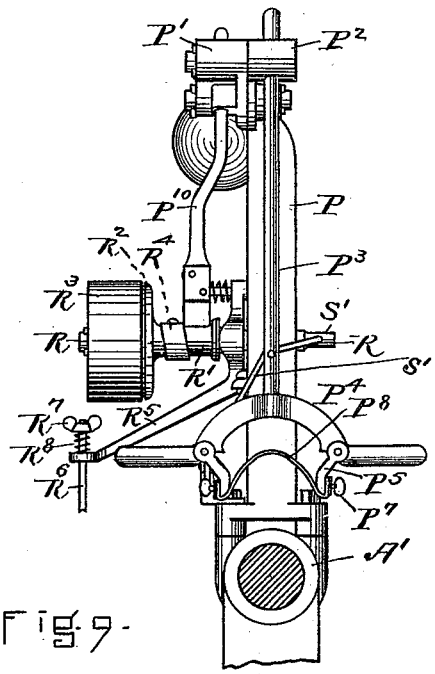
Figure 10:
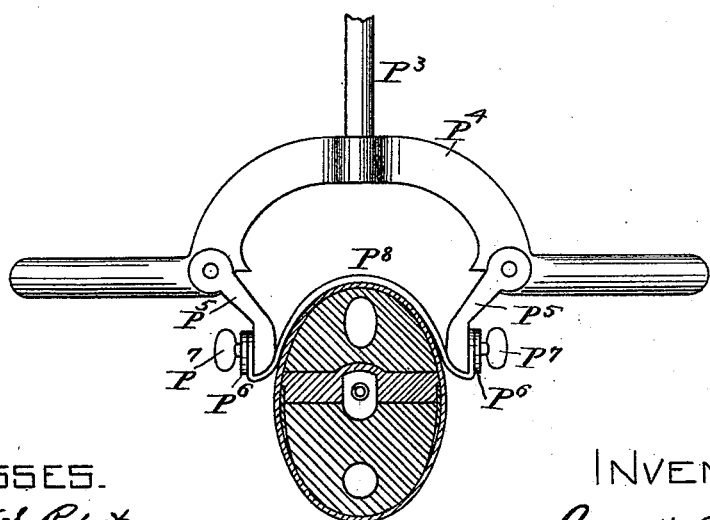
Figure 11:
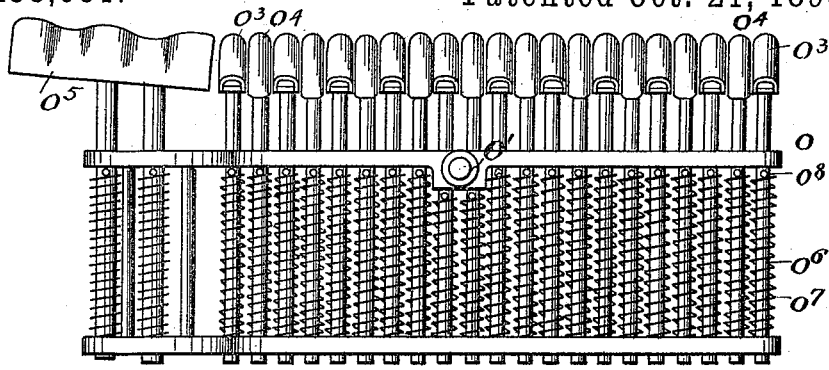
Figure 13:
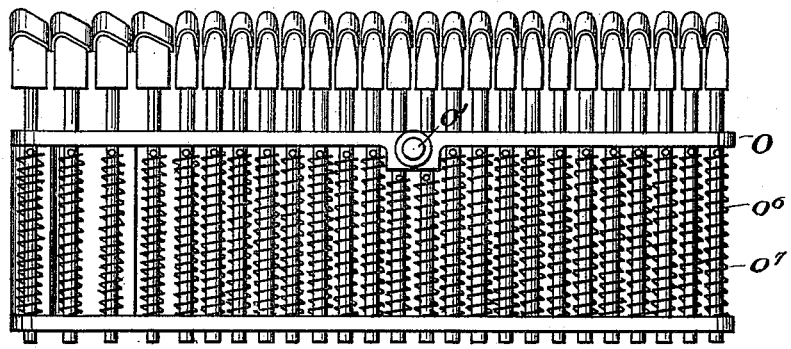
Figures 12, 14:
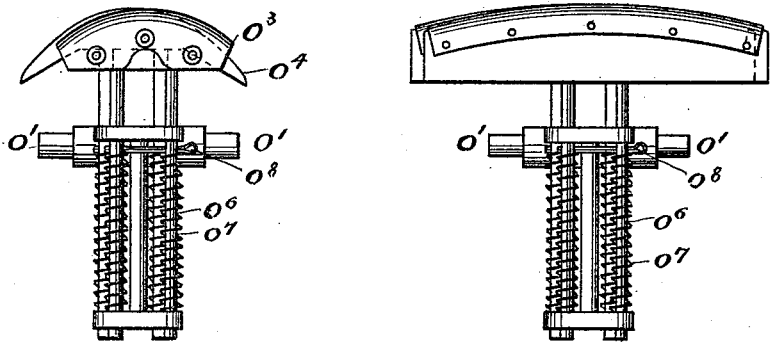

Figure 1 represents a side elevation of said boot-treeing machine, showing the treadle for operating the tree-expanding mechanism, the treadle for starting the machine, mechanism for regulating the pressure of the rubbing-tools, and mechanism for operating the rubbing-tools. Fig. 2 represents a side elevation of said machine on the side opposite to that shown in Fig. 1, showing the time-regulating mechanism and appliances for operating the strapping mechanism. Fig. 3 represents a front elevation of said machine with the boot-tree and tool-carrier removed. Fig. 4 represents a portion of the time-wheel, showing the blank tooth of said wheel, which permits continuous motion of the pawl while said wheel is at rest. Fig. 5 is a broken section showing the means for locking the boot-tree to the machine when the rubbing-tools are to be operated. Fig. 6 is a detached view of a part of the time-wheel and the swinging frame which governs the movements of the rubbing-tools to and from operative position. Fig. 7 is a side view of the strap-operating mechanism, and is a continuation of Fig. 2. Fig. 8 is a partial plan of Fig. 7, showing a sectional view below the line $x\,x$, Fig. 7. Fig. 9 is a front elevation of the strap-operating mechanism. Fig. 10 is an enlarged view showing the strap on the boot-tree. Fig. 11 is a side elevation of the tool-frame and tools employed during the "wetting-on" process. Fig. 12 is an end view of the same, showing the curvature of the working-faces of the tools and the relation of the tools to each other. Fig. 13 is a side elevation of the tool-frame and tools employed during the "taking off" process. Fig. 14 is an end view of the same, showing the shape of the working-faces of the tools and their relation to each other.

The standard or frame A, by which the mechanism is supported, consists of two parallel sides at a convenient distance apart having at the upper portion thereof suitable bearings A', in which revolves the sleeve B. The sleeve B is revolved at the desired times by the worm-gear B', fixed at the rear end thereof and between the two bearings formed on the frame A. It carries the cam $B^2$, that governs the stroke of the rubbing-tools with reference to the instep portion of the boot.

The bearings of boot-trees as manufactured for use in the ordinary bench-socket have been found inadequate to sustain the pressure of the rubbing-tools used in this machine and still allow the boot-tree to turn freely by hand and have sufficient support. In order to overcome this difficulty, the bearing of the boot-tree is rigidly fixed into a supplemental sleeve, which extends backward nearly through the sleeve B, a portion of which is shown in Fig. 5 with the locking-pin $B^3$ inserted therein. This supplemental sleeve is fitted to turn freely in the sleeve B, and forms a bearing for the boot-tree. The sleeve B is also provided with the locking-pin $B^3$, (see Fig. 5,) which positions the boot-tree with reference to the cam $B^2$, the bearing of the boot-tree being fitted into this sleeve, so that it revolves as freely as in the ordinary bench-socket for treeing purposes. When it is desired to use the boot-tree for hand operations—i. e., for sponging, dressing, &c.—it is disconnected from the sleeve by swinging the handle $B^4$, which withdraws the locking-pin $B^3$, held in position by the spring $B^5$.

The locking-pin $B^3$ and spring $B^5$ are held in position and guided in the tube or shell $B^6$, suitably fixed in a projection on the outer end of the sleeve B. (See Fig. 5.)

The sleeve B is revolved by the worm $C^2$, fixed on the crank-shaft C between the parallel sides of the frame A, in which sides are formed suitable bearings for said crank-shaft.

Upon the side of the machine shown in Fig. 3 the driving-pulley $C^3$ runs constantly upon the crank-shaft, and when it is desired to revolve the crank-shaft the clutch $C^4$, mounted upon the crank-shaft, is thrown into connection with the driving-pulley $C^3$ by means of the shipper-lever $C^6$, operated by the spring $C^7$.

Upon the side of the machine shown in Fig. 1 the crank $C'$ is fixed upon the crank-shaft C, and when revolving gives motion to the rubbing-tools by its connecting-rod D, reciprocating the slotted bell-crank lever $D'$, which in turn gives motion to the adjustable connecting-rod $D^3$, and thereby moves the oscillating tool-carrier E, upon the upper end of which the rubbing-tools are placed.

F represents the treadle of the tree-expanding mechanism hung to the frame A at $F'$, whose connecting-rod $F^2$ actuates the bell-crank lever $F^3$, hung between the sides of the frame at $F^5$. A link $F^4$ connects the upper end of this bell-crank lever $F^3$ with the ordinary shackle of a boot-tree, and a ratchet $F^6$, attached to a projecting part of the frame A, enables the operator to hold the tree spread at any tension, the whole forming the common jacking mechanism.

The driving-pulley $C^3$ is in constant motion upon the crank-shaft C, and has affixed to its hub the pinion $C^5$, which meshes with and drives the spur-wheel $C^8$, upon which is mounted the crank-pin $C^9$, carrying the pawl $C^{10}$, which rides upon the blank space $G^4$ of the time-wheel $G^3$ when the machine is not in operation.

When a boot has been properly prepared and jacked upon the boot-tree and the tree locked by the pin $B^3$ to the sleeve B, the operator by depressing with his foot the starting-treadle G causes the double-ended lever $G'$, that is attached to and revolves with the shaft, carrying the time-wheel $G^3$, to turn said time-wheel sufficiently so that the pawl $C^{10}$ will engage with the first tooth of the time-wheel, (see Fig. 1,) which by its motion releases the clutch-lever $C^6$, pivoted at $C^{11}$, and the spring $C^7$ (see Fig. 3) throws the clutch $C^4$ into contact with its opposite part fixed on the driving-pulley $C^3$, thereby causing the crank $C'$ and worm-gear $B'$ to revolve, the crank oscillating the rubbing-tools and the worm-gear turning the boot for their action. At the same time that the motion of the time-wheel releases the clutch-lever $C^6$ it also releases the arm $H'$ of the swinging frame H and allows the spring K to force the outer end of the swinging frame upward and with it the rubbing-tools resting on the oscillating tool-carrier E against the boot on the tree.

The swinging frame H is pivoted to the standard A at $A^2$, Figs. 1 and 2, and the force of the spring K, connected with the pin $H^2$, causes the swinging frame to press the tool-carrier E and rubbing-tools thereon upward against the jacked boot.

In the stretching or jacking of the boot-leg upon the tree the trees are spread apart by opening from the back through the longer axis of the oval formed by the tree-leg, and this causes a variation of the height of the rubbing-tools for extreme sizes while passing over the back of the boot-legs of nearly if not quite two inches, and if the spring pressing the tool-carrier up toward the tree operated as usual there would be considerable excess of pressure applied to the back of large legs when the pressure was set for the back of small legs of the same grade of leather. This excess of pressure would be injurious.

To obviate the constant necessity of adjustment of tool-pressure and also to cause the rubbing-tools if anything to press a little harder upon the seams of the boot-leg, which are carried on the short axis of the oval formed by the tree-leg, the spring K is so positioned with reference to the swinging frame H that it will draw angularly with reference to the motion of the swinging frame toward the boot-leg, and so that as the tension of the spring increases by reason of depression of the outer end of the swinging frame H the angular position changes and causes the spring K to have less leverage to draw the swinging frame H toward the boot-tree.

The tension of the spring K is governed at will by the operator by means of the chain $K'$, affixed to its end and passing over the wheel $K^2$, pivoted between the sides of the standard-frame at $A^3$ and then over the shaft $K^3$, to the outer end of which is affixed the hand-wheel $K^4$. By turning this hand-wheel the operator governs the tension of the spring K, the ratchet $K^5$, and pawl $K^6$, holding the tension of the spring at any desired point.

The oscillating tool-carrier E is pivoted to the outer end of the swinging frame H at $H^3$, and receives its motion from the connecting-rod $D^3$, attached to its upper end at $E'$.

The connecting-rod $D^3$ receives its motion from the sliding block $D^2$, that moves in the slotted bell-crank lever $D'$, driven by the crank $C'$ and intermediate connecting-rod D.

It will be observed that as the boot revolves it is necessary that the stroke of the rubbing-tools be shortened when the front portion of the boot over the instep is rubbed. To accomplish this result, the cam $B^2$ is fixed to and revolves in unison with the sleeve B, and its cam-roll M moves the sliding block M', that is connected with the bell-crank lever M³ by the link M². The bell-crank lever M³ has its bearing on one side of the frame at M⁴, and connected to its outer and longer end is the link M⁵, which moves the block D² in the slotted bell-crank lever D'. By the movement of the block in said slot the stroke of the rubbing-tool is shortened and lengthened at the proper points of the revolution of the boot-tree.

The pressure of the rubbing-tool upon the boot-leg as it revolves is constant, or nearly so, under the action of the spring K; but it being necessary, in order to properly rub the boot-leg at the seam portions, that the pressure should be greater at those places a seam pressure-spring N is hooked to the upper end of the pin H² and connected with the lever N' by the adjustable screw-rod N². The lever N' is located between the sides of the frame A and pivoted at N³, having its upper end N⁴ curved, so that the cams B⁷ on the face of the worm-gear B' will come in contact with the end N⁴ of said lever, and thereby raise the other end and give the desired tension to the spring N and the requisite pressure on the seam of the boot.

The revolution of the time-wheel controls the relations of the movement of the rubbing-tool with the revolution of the boot, and when the operator has moved the time-wheel by the starting-treadle G so that the constantly-moving pawl C¹⁰ will engage with the first tooth beyond the blank tooth he has no further care of the machine, the machine being started and stopped by the time-wheel itself. Attached to the time-wheel is the wedge or incline G⁶, that holds the clutch C⁴ away from its opposite part, fixed on the driving-pulley C³ when the time-wheel is at rest.

At the bottom of the clutch-lever C⁶ is located a shipper-spring C⁷, that tends to throw the bottom of the clutch-lever outward and the clutch C⁴, at the other end, into connection with its opposite part.

On the opposite side of the time-wheel a cam G⁵ is located with reference to the wedge or incline G⁶, that by engagement and disengagement with the lever H' controls the movements of the swinging frame H, (see Fig. 6,) in which the dotted lines show the position of the frame H preparatory to starting the machine and the full lines show the position preparatory to stopping the machine. When the time-wheel has nearly completed its revolution and so that the pawl engages with next to the last tooth before reaching the blank space G⁴, the wedge G⁶ engages with its counterpart C¹² on the clutch-lever C⁶ and through the continued motion of the time-wheel, for that tooth serves to draw inward the bottom end of the clutch-lever and throw out of connection the clutch C⁴ at the other end. At the same time the cam G⁵ engages with the lever H', presses down the outer end of the swinging frame H, and thereby withdraws the rubbing-tools from the boot. The pawl then engages with the last tooth and turns the time-wheel so that its further movement will be upon the blank space until thrown into connection again by the starting-treadle, as hereinbefore described.

The movement of the time-wheel caused by the engagement of the pawl with the last operative tooth insures the location of the rubbing-tools at their farthest backward limit from the boot-leg when the machine has stopped, so as not to interfere with the turning of the boot by hand during the several hand operations. This is accomplished by attaching to the under side of the bell-crank lever D' a curved spring-lever D⁴, of sufficient strength to move the parts connected with said bell-crank lever D' to their extreme backward limit by engagement with the end of the lever G' opposite to that which the operating-treadle acts upon, which lever is affixed to the shaft of the time-wheel and revolves therewith.

When the pawl C¹⁰ commences to move the time-wheel by contact with the last operative tooth, the end of the lever G' has in its revolution reached a point where it will engage with the end of the spring D⁴ if the machine has stopped at the extreme forward limit of stroke, the crank C' then being on its upper center, which is of seldom occurrence, however, and as the lever G' strikes against the end of the spring it gives way and allows the end of the lever to pass under it, making a ringing sound, that signifies to the operator he cannot turn the boot-tree without danger to the boot from contact with the rubbing-tools. The operator then moves the rubbing-tools to their backward limit.

Whenever the crank stops at any point other than the upper dead-center, the revolution of the lever G', by contact with the spring D⁴, brings the rubbing-tools into proper position at the farthest backward limit, and the machine is then ready for starting again.

In the process of treeing boots on this machine the same routine of wetting on and taking off is followed as in hand treeing.

For the wetting-on process the tool shown in Figs. 11 and 12 is employed, which consists of a series of rubbing-faces mounted and working in the tool-frame O, as will be hereinafter described. The tool-frame O is balanced on trunnions O' and hung in the proper bearings E² of the tool-carrier E, the trunnions being held in their bearings by springs O², which hold the tool parallel with the boot-tree when the machine is stopped, and which allow the tool to conform to the various inclinations of the boot-leg when the machine is in operation. The faces of the rubbing-tool for the wetting-on process are arranged in pairs—one O³ having a leather face with an elastic cushion beneath, and the other O⁴ having a metal face—and the working-faces of these tools are curved, as shown in Fig. 12, so that they fit to and rub thoroughly the sides of the seams. These tools are so positioned in the tool-frame O that as the boot is revolved once over them it receives two distinct rubbings—one by the metal faces which precede and rub hard, the other by the cushioned leather faces that follow and finish. The last tool of the series $O^5$ is formed to rub the knee end of the leg and is extended lengthwise, so that while one end passes over the leather and finishes the extreme upper portion of it the other end remains over it, so that the return movement of the tool will not rumple up the leather. The several rubbing-faces in the frame O are supported on double spindles $O^6$, and the spiral springs $O^7$ encircle the said spindles and by pressing the cross-pins $O^8$ against the under side of the top of the frame give the desired alignment to the face of the tool when not in operation. The combined tension of all these springs in one tool is sufficient to resist the springs K and N without allowing any of the several working parts of the tool to move down to and come into contact with the top of the tool-frame O.

Figs. 13 and 14 represent the working-tools used in the taking-off process, which are designed to finish more especially the front and back of the boot-leg, and are arranged in pairs to lead and follow, as in the first-described tool; but being all of the same shape and construction, excepting the last four, which are wider and inclined toward the instep portion of the boot, and in the process of rubbing the upper end of the boot-leg they pass up to and beyond the end and return without injury to the leather, which is more stable than when rubbed in the preceding process. Owing to the variations in the length of boot-legs and to the fact that the strokes of the tool-carrier E are constant, it will be found necessary to have tools of different lengths, the trunnions of which being so located in one of the bearings of the tool-carrier $E^2$ that the tool will properly balance, and will not during the action of the machine overrun the heel or sole of the boot.

It is customary after the boot has been subjected to the rubbing process to evenly spread the dressing over the surface and shape the front and back more nearly to the form of the tree and remove any defects of appearance left by the rubbing process by means of passing a strap of leather lengthwise over the surface of the boot. This is a laborious part of the operation, and for the purpose of making lighter that part of the work and yet improving it there is attached to the machine mechanism for this purpose (shown in Figs. 1, 2, 3, 7, 8, 9, and 10 of the drawings) and constructed as follows:

A post P is properly secured to the cap of the bearing, in which revolves the sleeve B, directly in front of the cam $B^2$, and pivoted to the upper end of this post is the swinging arm P'. The arm P' at its outer end has a pivot-bearing $P^2$, in which is secured at a proper position over the central line of the boot-tree the rod $P^3$. The rod $P^3$ has affixed to it a frame with handle $P^4$, and, as seen in Fig. 10, there are pivoted to this frame $P^4$ two swinging arms $P^5$, that carry between their outer ends the finishing-strap $P^8$, secured to them by clamps $P^6$ and screws $P^7$. In this construction the swinging arms $P^5$ are so pivoted with reference to their length and the length of the finishing-strap $P^8$ that the pressure of the strap is about equally distributed upon the surface of the leather passed over. The finishing-strap $P^8$ is drawn down upon the boot by the lever $P^{10}$, connected with the swinging arm P'.

Fixed in the post P is the shaft R at right angles to the motion of the swinging-arm P', and free to revolve on this shaft R is a spool R', connected with the outer end of the lever $P^{10}$, and with the spool R' is the strap $R^4$. As the strap $R^4$ is wound around the spool R', it draws the lever $P^{10}$ toward the spool, and by the intermediate parts draws the boot-finishing strap $P^8$ down upon the surface of the boot. To accomplish this result, the pulley $R^3$ is connected by a belt with the constantly-revolving driving-pulley $C^3$ of the machine, and interposed between this pulley $R^3$ and an enlarged part of the spool R' is the frictional washer $R^2$.

In order to cause the strap $R^4$ to wind around the spool R', the lever $R^5$, properly pivoted to the post P, is depressed by the rod $R^6$, causing the spool R' to move toward the frictional washer $R^2$, and by the revolution of the spool to draw the swinging arm P' toward the boot with the desired force, which is regulated by the adjusting thumb-screw $R^7$.

In order to draw the finishing-strap $P^8$ lengthwise of the boot, there is attached to the rod $P^3$ a sheave S, through which passes the rope or cord S', one end of which being attached to the shaft R, and the other end leading through the swinging sheave $S^2$ to the spool $S^3$. As the cord S' is wound around the spool $S^3$, it draws the finishing-strap from the foot toward the knee portion. (See Figs. 3 and 7.)

In order to cause the spool $S^3$ to revolve and wind the cord around it, a stud T is properly located upon the frame A, so that the pinion T' will intermesh and revolve with the constantly-revolving spur-wheel $C^8$, and interposed between the pinion T' and the enlarged portion of the spool $S^3$ is a frictional washer similar to that used for the purpose of drawing the swinging arm P' toward the boot, frictional contact of the two parts being caused by drawing down the wedge $T^2$ (see Fig. 3) between the pinion T' and the cross-pin $T^4$.

In order to operate the wedge $T^2$, it is connected to the treadle $T^5$, pivoted at $T^6$, by the adjustable rod $T^3$, and also connected with this same treadle is the rod R⁶, so that the first downward movement of the treadle T⁵ draws down the rod R⁶ and compresses the adjustable spring R⁸ until the pressure of the finishing-strap upon the boot is sufficient. Then the continued downward movement of the treadle T⁵ draws down the rod T³ and causes the wedge T² to produce frictional contact between the spool S³ and pinion T′ to wind the cord S′ around the spool and thereby draw the finishing-strap from the toe or heel of the boot toward the knee portion. When pressure is removed from the treadle T⁵, the counter-balance P″ restores all the parts to their original position.

Having thus fully described the nature, construction, and operation of said improvements, we claim and desire to secure by Letters Patent of the United States—

1. In a machine for treeing boots, the combination of a sleeve and a boot-tree mounted therein which is capable of being revolved by the hands of the operator, and locking mechanism, substantially as described, for locking said device to the operative parts of the machine and to be automatically revolved thereby at the will of the operator, substantially as described.

2. In a machine for treeing boots, the combination of the treadle G, the double-ended lever G′, the shaft G², and the ratchet-wheel G³, and boot-treeing mechanism, substantially as specified, all constructed and arranged substantially in the manner and for the purposes shown and described.

3. In a machine for treeing boots, the combination of a swinging frame for pressing the rubbing-tools against the surface of the boot, a horizontal adjustable spring attached to the swinging frame for the purpose of giving a constant pressure of said rubbing-tools, and an auxiliary vertically-adjustable spring attached to said swinging frame, both of said springs being independent of the tool-carrying arm, and the latter spring operating to give additional pressure to the rubbing-tools when the seams of the boot are presented to them, substantially as and for the purpose set forth.

4. In a boot-treeing machine, means for insuring the location of the rubbing-tools at their backward limit when the machine stops at the end of the revolution of the boot-tree, substantially as shown and described, consisting of a spring-lever D⁴, operating in combination with the rigid lever G′, mounted on the time-wheel shaft, and connecting mechanism, for the purposes set forth.

5. In combination with a boot-tree, a finishing-strap, and mechanism, substantially as described, for automatically pressing it upon and moving it along the central longitudinal line of the tree from the toe or heel portion of the boot to or over the knee portion, substantially as described.

6. In a rubbing-tool for boot-treeing machines, elastically mounted upon a swinging frame H and arranged to reciprocate in the line of the longer axis of the boot-tree around which the boot-tree revolves, the combination of a series of alternate sets of curved working-faces O³ and O⁴, whereby the boot-leg receives two distinct series of rubbings at each revolution of the boot-tree, substantially as shown and described.

7. In a rubbing-tool for a boot-treeing machine, elastically mounted upon a swinging frame H, the combination, with a series of rubbing-faces, of a long undulating working-face O⁵ for operation upon the upper end of the boot-leg, substantially as shown and described.

GEO. W. COPELAND.
JOS. E. CRISP.

Witnesses:
JOHN L. S. ROBERTS,
MARY E. WOODBURN.